US011992870B2

(12) United States Patent
Genereux et al.

(10) Patent No.: US 11,992,870 B2
(45) Date of Patent: May 28, 2024

(54) FLANGE FORMING DEVICE AND METHOD OF FORMING A FLANGE ON A SHEET METAL PART TO REDUCE SURFACE DISTORTION

(71) Applicant: Ford Motor Company, Dearborn, MI (US)

(72) Inventors: Christian Richard Genereux, Brighton, MI (US); Robert Vaughn Degenhardt, Belleville, MI (US); Philip Trinh, Royal Oak, MI (US)

(73) Assignee: Ford Motor Company, Dearborn, MI (US)

( * ) Notice: Subject to any disclaimer, the term of this patent is extended or adjusted under 35 U.S.C. 154(b) by 19 days.

(21) Appl. No.: 17/737,414

(22) Filed: May 5, 2022

(65) Prior Publication Data

US 2022/0258224 A1 Aug. 18, 2022

Related U.S. Application Data

(62) Division of application No. 16/026,653, filed on Jul. 3, 2018, now Pat. No. 11,358,204.

(51) Int. Cl.
| | |
|---|---|
| *B21D 39/02* | (2006.01) |
| *B21D 5/04* | (2006.01) |
| *B21D 19/04* | (2006.01) |
| *B21D 19/08* | (2006.01) |
| *B21D 37/04* | (2006.01) |
| *B62D 25/16* | (2006.01) |

(52) U.S. Cl.
CPC ........... *B21D 39/021* (2013.01); *B21D 5/047* (2013.01); *B21D 19/043* (2013.01); *B62D 25/16* (2013.01); *B21D 19/082* (2013.01); *B21D 37/04* (2013.01)

(58) Field of Classification Search
CPC ...... B21D 37/04; B21D 39/021; B21D 5/047; B21D 19/043; B21D 19/04; B21D 19/02; B21D 19/06
See application file for complete search history.

(56) References Cited

U.S. PATENT DOCUMENTS

| | | | |
|---|---|---|---|
| 7,290,318 B2 * | 11/2007 | Bradley | B21D 39/021 29/505 |
| 2002/0116975 A1 * | 8/2002 | Hartley | B21D 39/021 72/306 |
| 2006/0000255 A1 * | 1/2006 | Baulier | B21D 39/021 72/306 |
| 2014/0047889 A1 * | 2/2014 | Golovashchenko | B21D 5/06 72/316 |

\* cited by examiner

*Primary Examiner* — Teresa M Ekiert
(74) *Attorney, Agent, or Firm* — Burris Law, PLLC

(57) ABSTRACT

A method of forming a vehicle panel includes deforming a sheet metal workpiece between stamping tools to form a first and second edges that converge at a corner of the workpiece's main surface. The first edge is defined by a junction of the main surface and a first flange. The second edge is defined the main surface and a second flange. Forming the first and second edges includes deforming the workpiece so that the second flange has a first region bent to a first angle relative to the main surface and an unwinding region bent to an angle that unwinds from the first region as the second flange approaches the corner. The method includes deforming the workpiece between a second set of stamping tools that deform the first flange and the unwinding region of the second flange until the first and second flanges are bent greater than 90°.

9 Claims, 11 Drawing Sheets

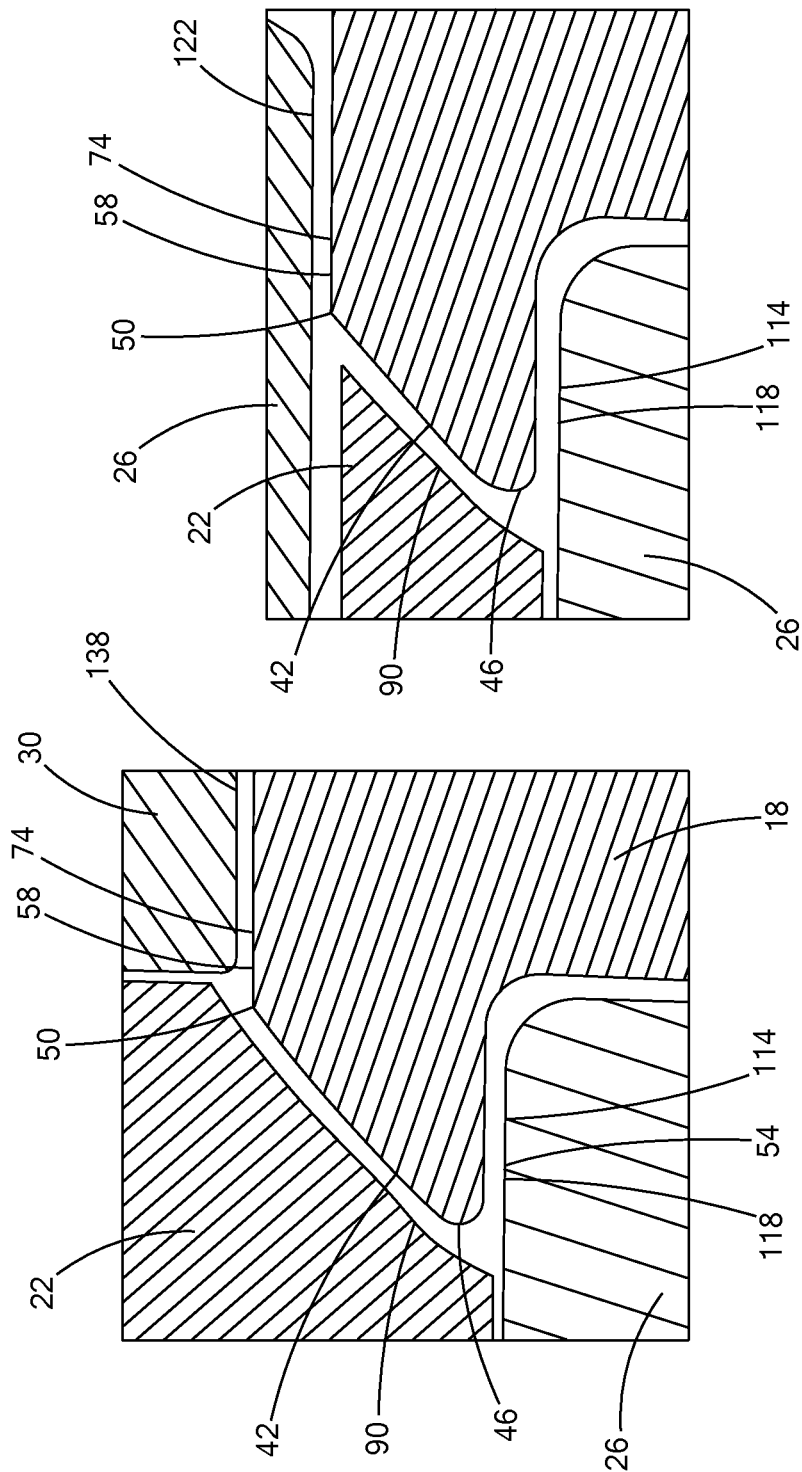

FLANGE FORMING DEVICE AND METHOD OF FORMING A FLANGE ON A SHEET METAL PART TO REDUCE SURFACE DISTORTION

CROSS-REFERENCE TO RELATED APPLICATIONS

This application is a divisional application of U.S. Ser. No. 16/026,653, filed Jul. 3, 2018 and titled "FLANGE FORMING DEVICE AND METHOD OF FORMING A FLANGE ON A SHEET METAL PART TO REDUCE SURFACE DISTORTION," the content of which is incorporated herein in its entirety.

FIELD

The present disclosure relates to a flange forming device and method of forming a flange on a sheet metal part to reduce surface distortion.

BACKGROUND

The statements in this section merely provide background information related to the present disclosure and may not constitute prior art.

External vehicle body panels typically require complex curvatures with Class A surfacing. Surfaces specified as Class A surfaces require high tolerances since these surfaces are typically intended to be visible exterior surfaces in the assembled vehicle. Vehicle body panels are typically formed from sheet metal material through a stamping or pressing operation that deforms the metal into the desired shape. In order to produce smooth edges where the Class A surface meets another part (e.g., a fender meets a headlamp or hood), the edges of the sheet metal are typically bent over to form the edge and a flange that is the portion of metal bent behind the Class A surface. To achieve the desired functionality and aesthetics, the flange is typically bent over through an angle greater than 90° relative to the Class A surface so that the flange is generally bent back over the interior side of the part.

Bending the flange to this degree can be especially difficult when two flanges meet at a corner of the Class A surface. Bending the flanges near the corner with typical bending or stamping techniques can result in inconsistent bends and distortions in the geometry of the Class A surface. These distortions can require post operation finishing work (e.g., grinding, additional forming, etc.) to return the Class A surface geometry to the intended shape and tolerances. These finishing operations can add significant time, cost, and scrap rates to the manufacturing of the parts.

These and other limitations of traditional forming methods for sheet metal features such as flanges are addressed by the present disclosure.

SUMMARY

In one form, a method of forming a vehicle body panel from a sheet metal workpiece having a main surface includes deforming the workpiece between a first set of stamping tools to form a first edge of the main surface and a second edge of the main surface that converge to define a corner of the main surface. The first edge is defined by a junction of the main surface and a first flange. The second edge is defined by a junction of the main surface and a second flange. The step of deforming the workpiece to form the first and second edges includes deforming the workpiece so that the second flange has a first region bent to a first angle relative to the main surface and an unwinding region that is bent to an angle relative to the main surface that unwinds from the first region as the second flange approaches the corner. The method further includes deforming the workpiece between a second set of stamping tools. The second set of tools deform the first flange and the unwinding region of the second flange until the first and second flanges have been bent greater than 90° relative to the main surface.

According to a further form, the unwinding region of the second flange unwinds from a first bend amount that is greater than 90° relative to the main surface to a second bend amount that is greater than 0° and less than 90° relative to the main surface.

In yet another form, the main surface is a Class A surface.

In still another variation, the step of deforming the workpiece between the first set of stamping tools includes controlling an angle of the unwinding region by pressing the unwinding region between an upper steel and a lower steel.

In yet another form, the first set of stamping tools includes a first flange post, a first flange steel, and a second flange steel. The step of deforming the workpiece between the first set of stamping tools includes positioning the workpiece on the first flange post, moving the first flange steel in a first direction relative to the first flange post, and moving the second flange steel in a second direction relative to the first flange post. The second direction is transverse to the first direction.

In still another variation, when the first flange steel and the second flange steel are in a closed position relative to the first flange post, work surfaces of the first flange steel and the second flange steel are spaced apart from the first flange post by a thickness of the workpiece.

According to a further form, when the first flange steel is in the closed position the first flange steel contacts the first flange. When the second flange steel is in the closed position the second flange steel contacts the first region and the unwinding region.

In yet another form, when the first flange steel is in the closed position the first flange steel contacts a portion of the unwinding region.

In still another form, the second set of stamping tools includes a second flange post and a third flange steel that is movable relative to the second flange post in a third direction between an open position and a closed position. When the third flange steel is in the closed position the third flange steel contacts the first flange and the unwinding region of the second flange.

In another form, a method of forming a vehicle panel from a sheet metal workpiece having a surface includes forming a first flange and forming a second flange that transitions from a first region bent greater than 90° relative to the surface to a second region bent less than 90° relative to the surface. The second region and the first flange converge at a corner of the surface. The method further includes subsequently bending the second region greater than 90° relative to the surface.

According to a further form, the step of forming the second flange includes pressing the workpiece between a first set of stamping tools. The first set of stamping tools contact front and back sides of the second flange along the first and second regions to provide a controlled bend along the first and second regions.

In still another form, the step of forming the first flange includes bending the first flange to a first angle relative to the surface. The step of bending the second region greater than 90° includes pressing the workpiece between a second set of stamping tools. The second set of stamping tools includes a flange steel that deforms the second region to be bent greater than 90° relative to the surface and deforms the first flange to a second angle that is greater than the first angle.

In yet another variation, the step of forming the first flange includes pressing the workpiece between the first set of stamping tools. The first set of stamping tools includes a first flange steel that contacts and forms the first flange and at least a portion of the second region.

According to a further form, the surface is a Class A surface.

In still another form, the steps of forming the first flange and forming the second flange include positioning the workpiece on a flange post, moving a first flange steel in a first direction relative to the flange post to press the workpiece between the first flange steel and the flange post to form the first flange, and moving a second flange steel in a second direction relative to the flange post to press the workpiece between the second flange steel and the flange post to form a majority of the second flange.

In yet another form, when the first flange steel and the second flange steel are in a closed position relative to the flange post, work surfaces of the first flange steel and the second flange steel are spaced apart from the flange post by a thickness of the workpiece.

According to a further form, when the first flange steel is in a closed position the first flange steel contacts the first flange and when the second flange steel is in a closed position the second flange steel contacts the first and second regions.

In still another form, when the first flange steel is in the closed position the first flange steel contacts the second region.

In another form, a set of stamping tools for forming a body panel from a sheet metal workpiece are provided. The body panel has a Class A surface, a first flange along a first edge of the Class A surface, and a second flange along a second edge of the Class A surface. The first and second edges converge to form a corner of the Class A surface. The stamping tools include a first anvil, a first pad, a first flange steel, and a second flange steel. The first pad is configured to hold the workpiece against the first anvil. The first flange steel is movable relative to the first anvil and the first pad between an open position and a closed position. The first flange steel is configured to contact the first flange to bend the first flange along the first edge when the first flange steel moves from the open position to the closed position. The second flange steel is movable relative to the first anvil and the pad between an open position and a closed position. The second flange steel is configured to contact a first region of the second flange to bend the first region along the second edge when the second flange steel moves from the open position to the closed position. The second flange steel includes a first unwinding surface that is configured to contact a second region of the second flange to bend the second region along the second edge an amount that unwinds from the first region as it approaches the corner when the second flange steel moves from the open position to the closed position. The first anvil includes a second unwinding surface that is configured to oppose the first unwinding surface. The first and second unwinding surfaces have an angle that unwinds relative to the Class A surface with proximity to the corner.

According to a further form, the stamping tool further includes a second anvil, a second pad, and a third flange steel. The second pad is configured to hold the workpiece against the second anvil after the workpiece has been deformed by the first and second flange steels. The third flange steel is movable relative to the second anvil and the second pad between an open position and a closed position. The third flange steel is configured to contact the first flange and the second region to bend the first flange and the second region to an angle that is greater than 90° relative to the Class A surface when the third flange steel moves from the open position to the closed position.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 10 is a cross-sectional view of the set of tools of FIG. 1, taken along line 10-10 shown in FIG. 7, illustrating the main pad, first flange steel, and second flange steel in closed positions;

FIG. 11 is a cross-sectional view of the set of tools of FIG. 1, taken along line 11-11 shown in FIG. 7, illustrating the main pad, first flange steel, and second flange steel in closed positions;

Figure 1:
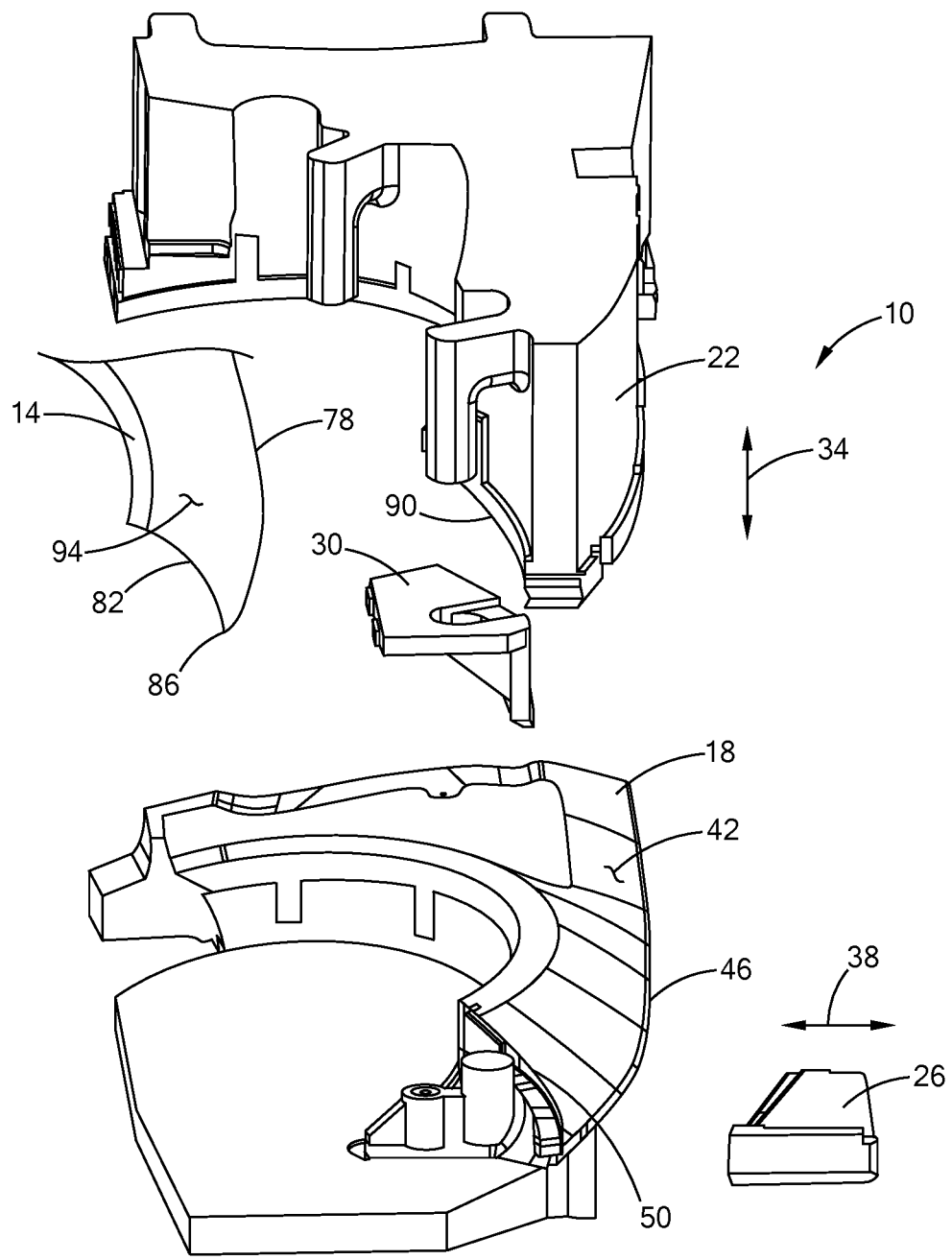
FIG. 1 is a perspective view of a first set of stamping tools in accordance with the teachings of the present disclosure, illustrating a main pad, a first flange steel, and a second flange steel in open positions relative to an anvil and a sheet metal workpiece.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a first set of stamping tools 10 for performing a first set of stamping operations on a sheet metal workpiece 14 are illustrated. The first set of stamping tools 10 include a flange post (i.e., a first anvil 18), a first pad 22, a first flange steel 26, and a second flange steel 30. In the example provided, the first anvil 18 is generally stationary while the first pad 22, the first flange steel 26, and the second flange steel 30 are movable relative to the first anvil 18 and can be moved by a pressing machine (not shown, e.g., a hydraulic press). The first flange steel 26 is generally movable along a first axis or first direction 38 relative to the first anvil 18. The first pad 22 and the second flange steel 30 are generally movable along a second axis or second direction 34 relative to the first anvil 18. The first pad 22 and the second flange steel 30 are also movable relative to each other along the second direction 34. The second direction 34 is transverse to the first direction 38. In FIG. 1, the first pad 22, the first flange steel 26, and the second flange steel 30 are illustrated in open (i.e., retracted) positions relative to the first anvil 18, such that the workpiece 14 can be inserted or removed from between the first anvil 18 and the first pad 22. With additional reference to FIG. 4, the first pad 22 is illustrated in a closed position relative to the first anvil 18, with the first and second flange steels 26, 30 in their respective open positions.

Figure 3:
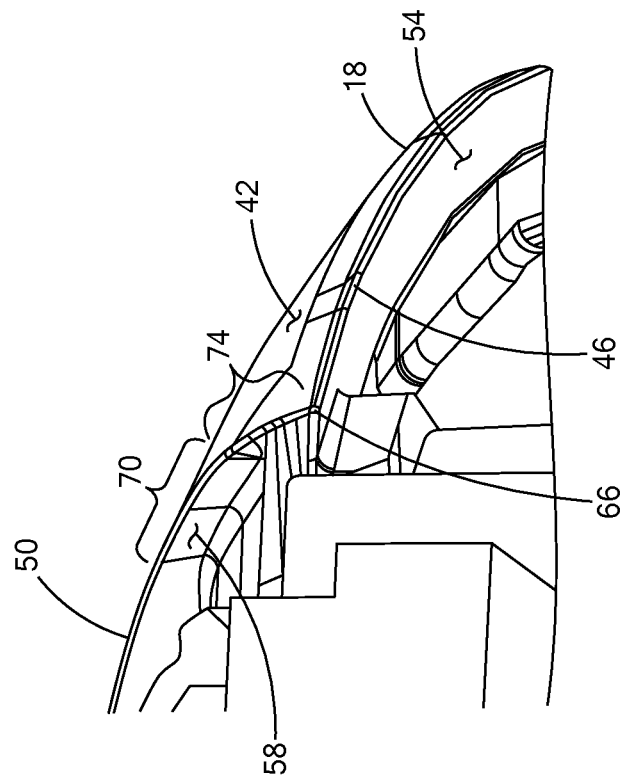
FIG. 3 is a perspective view of a second side of the anvil of FIG. 1.
Figure 2:
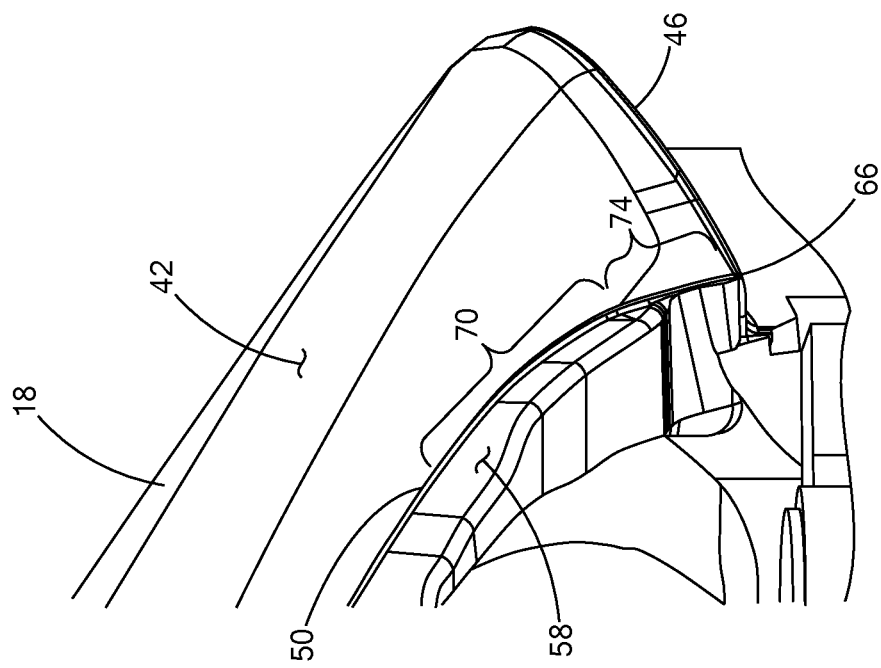
FIG. 2 is a perspective view of a first side of the anvil of FIG. 1.

Returning to FIG. 1 and with additional reference to FIGS. 2 and 3, the first anvil 18 has a supporting surface 42, a first anvil edge 46, a second anvil edge 50, a first bend surface 54, and a second bend surface 58. The supporting surface 42 is configured to support an interior surface 62 (FIG. 13) of the workpiece 14. The supporting surface 42 generally matches to the shape of the interior surface 62 of the workpiece 14. The first anvil edge 46 is defined by the intersection of the supporting surface 42 and the first bend surface 54. The second anvil edge 50 is defined by the intersection of the supporting surface 42 and the second bend surface 58. The first anvil edge 46 and the second anvil edge 50 converge at a corner 66 of the first anvil 18.

The first bend surface 54 forms a sharp angle with the supporting surface 42 along the first anvil edge 46. In the example provided, the sharp angle between the first bend surface 54 and the supporting surface 42 is relatively consistent and continues all the way to the corner 66. The second bend surface 58 forms a changing angle with the supporting surface 42 along the second anvil edge 50 such that the second bend surface 58 forms a sharp angle with the supporting surface 42 in a first region 70 distal to the corner 66. The angle between the second bend surface 58 and the supporting surface 42 unwinds (i.e., becomes flatter) as the second anvil edge 50 approaches the corner 66. In other words, the second bend surface 58 generally becomes more parallel to the supporting surface 42 as the second anvil edge 50 approaches the corner 66. In the example provided, the second bend surface 58 has a relatively consistent angle in the first region 70 and begins a controlled unwinding at a second region 74 that is proximate to the corner 66. In the example provided, the angle between the second bend surface 58 and the supporting surface 42 does not fully unwind to the degree of being flat with the supporting surface 42 and, instead, maintains a slight angle proximate to the corner 66 to still define the second anvil edge 50.

When the workpiece 14 is supported on the first anvil 18, a first edge 78 of the workpiece 14 overhangs the first anvil edge 46 and a second edge 82 of the workpiece 14 overhangs the second anvil edge 50. The first and second edges 78, 82 of the workpiece 14 converge at a corner 86 of the workpiece 14 that overhangs the corner 66 of the first anvil 18.

The first pad 22 has a clamping surface 90 that opposes the supporting surface 42 and generally matches the shape of a main outer surface of the workpiece 14. In the example provided, the main outer surface of the workpiece is a Class A surface and indicated with reference numeral 94. When the first pad 22 is in the closed position (FIG. 4), the clamping surface 90 is configured to contact the Class A surface 94 and hold the workpiece 14 against the supporting surface 42 with sufficient pressure to hold the workpiece 14 stationary relative to the first anvil 18.

Figure 4:
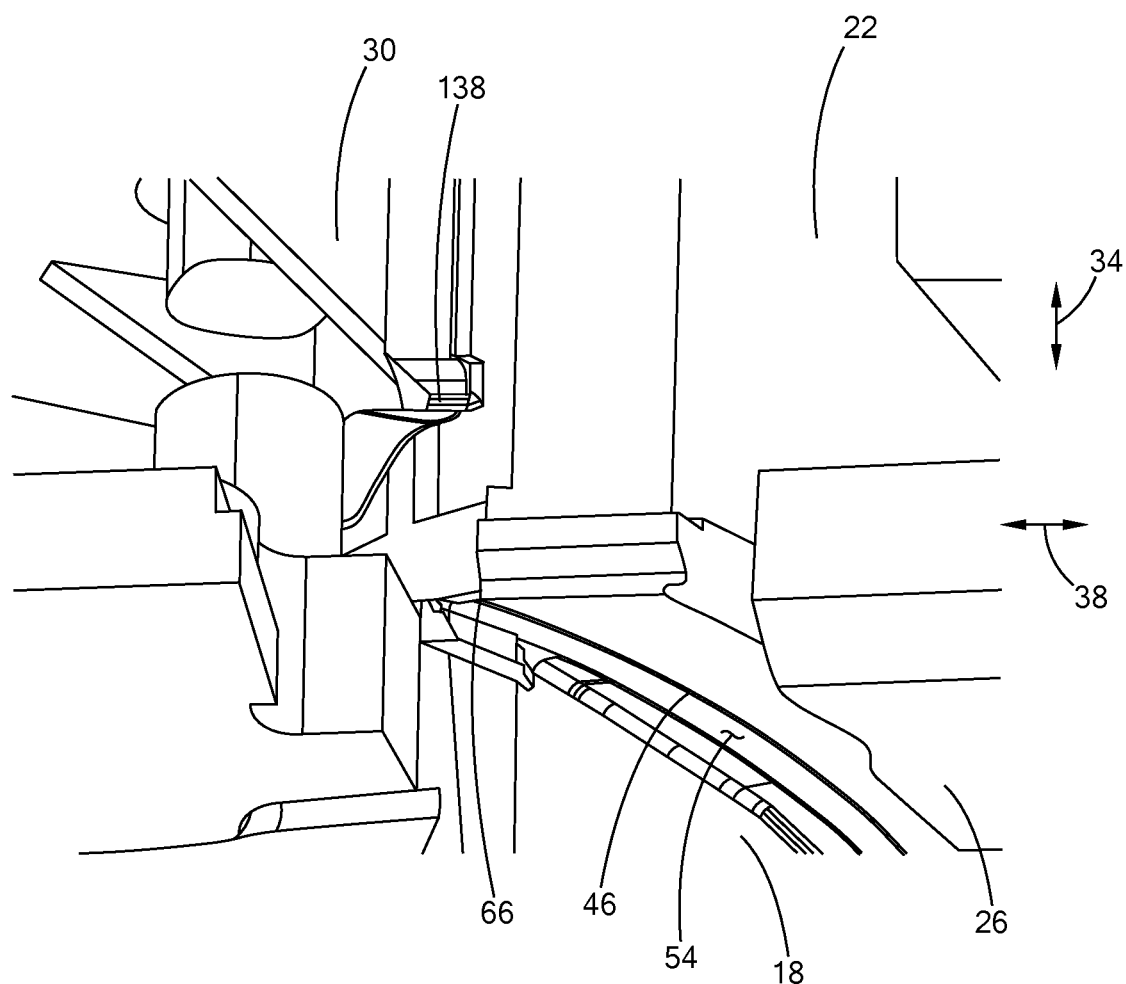
FIG. 4 is a perspective view of the set of tools of FIG. 1, illustrating the main pad in a closed position with the first and second flange steels in open positions.
Figure 5:
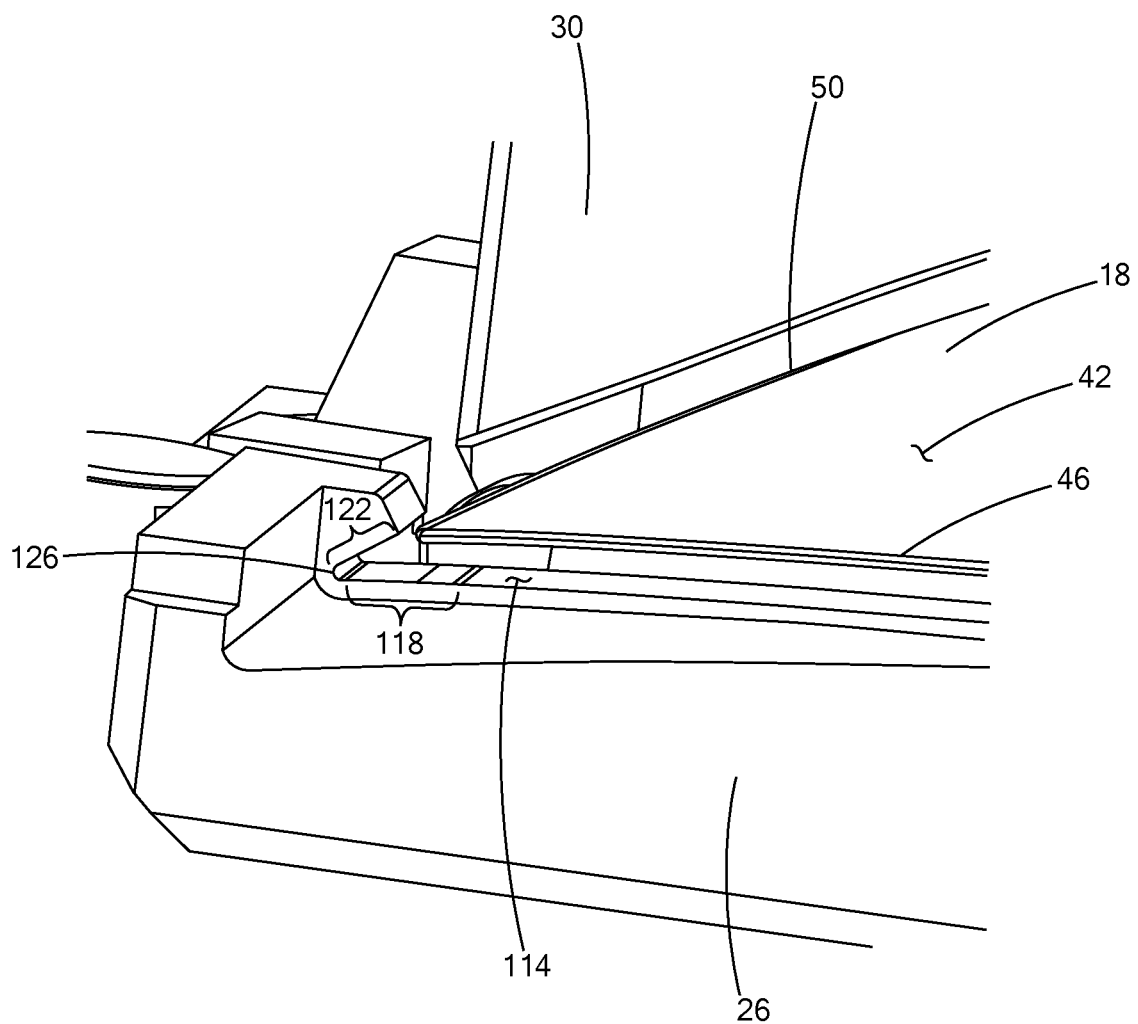
FIG. 5 is a perspective view of the set of tools of FIG. 1, illustrating the first flange steel in the open position and the second flange steel in a closed position with the main pad omitted from the view for illustration purposes.

As shown in FIG. 4, the first pad 22 can be in the closed position while the first flange steel 26 and the second flange steel 30 are in their open positions. From this position, the first flange steel 26 and the second flange steel 30 can be moved to their closed positions. In the example provided, the first flange steel 26 and the second flange steel 30 can be moved simultaneously so as to form their respective bends at the same time. With additional reference to FIG. 5, the first flange steel 26 is illustrated in the open position with the second flange steel 30 illustrated in the closed position. In FIG. 5, the first pad 22 is omitted from the view to better show the second flange steel 30. With additional reference to FIG. 6, the first flange steel 26 is illustrated in the closed position, while the second flange steel 30 is shown in the open position. With additional reference to FIG. 7, the first flange steel 26 and the second flange steel 30 are illustrated in their closed positions, while the first pad 22 is omitted from the view for clarity of illustration. As shown in FIG. 7, the first and second flange steels 26, 30 are spaced apart by a gap 110 when in the closed position. In the example provided, this gap 110 is approximately 0.4 mm.

Figure 6:
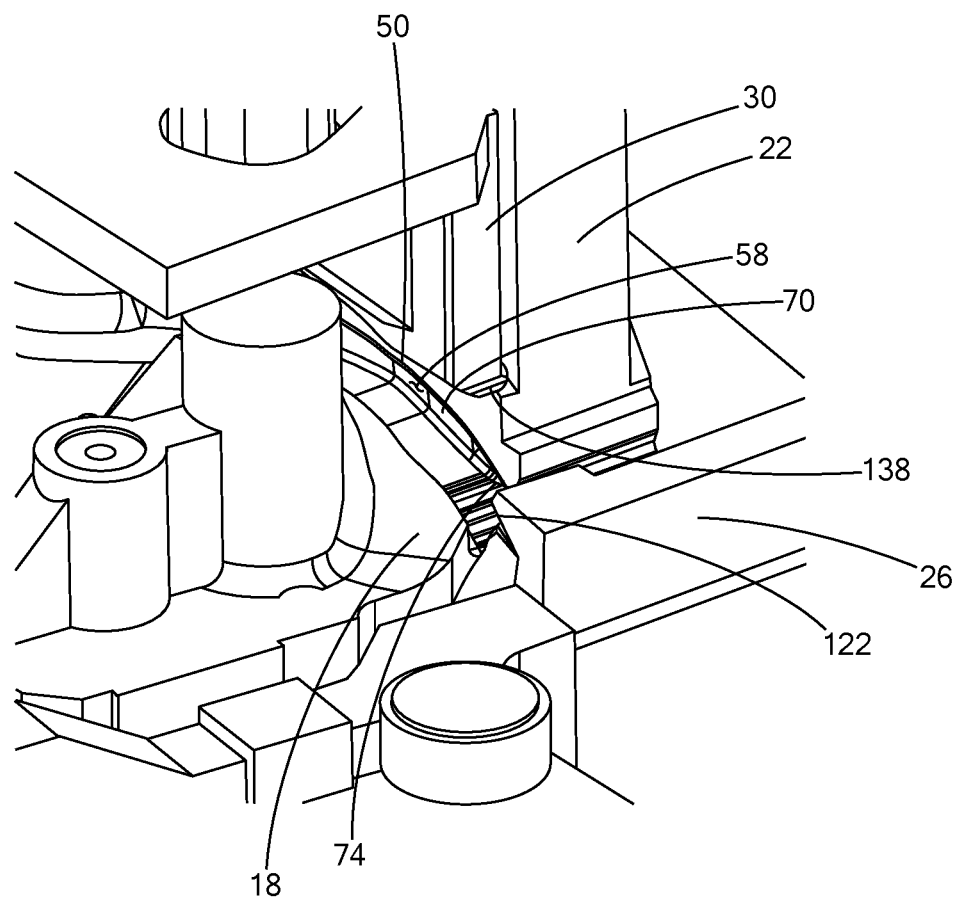
FIG. 6 is a perspective view of the set of tools of FIG. 1, illustrating the main pad and the first flange steel in closed positions and the second flange steel in the open position.
Figure 7:
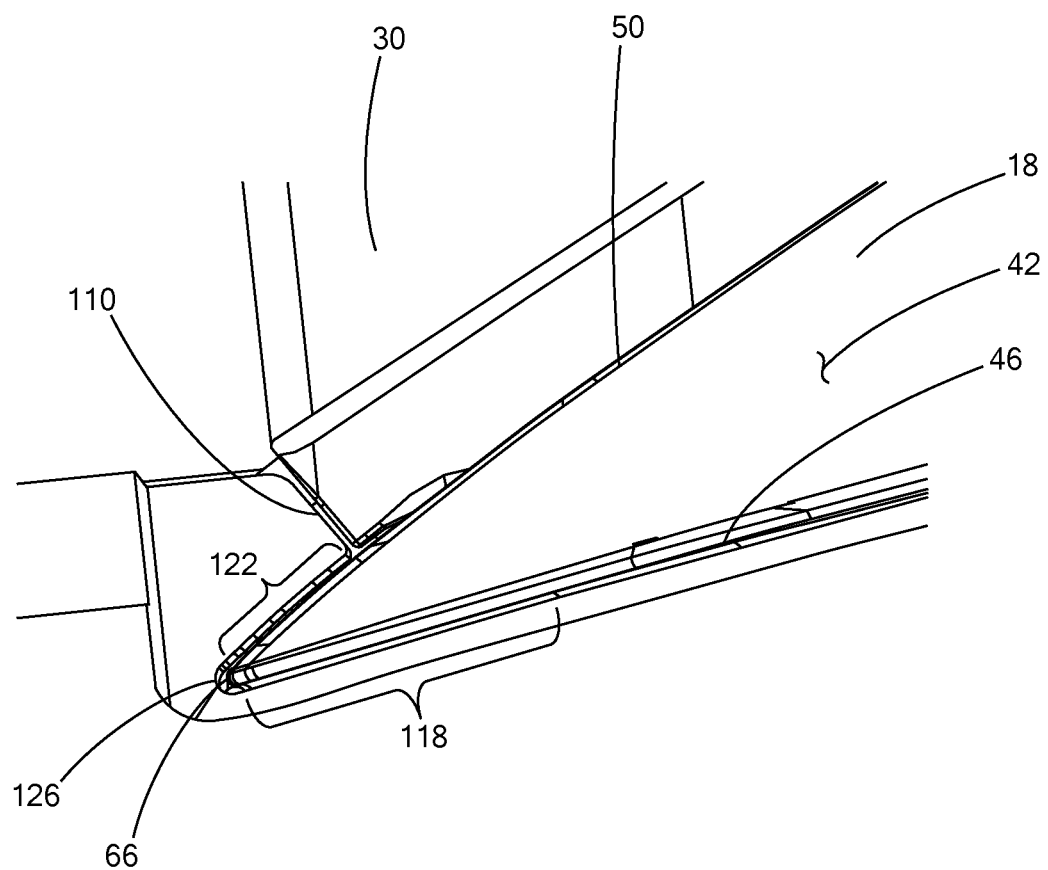
FIG. 7 is a perspective view of the set of tools of FIG. 1, illustrating the first flange steel and the second flange steel in closed positions, with the main pad omitted from view for illustration purposes.

With reference to FIGS. 5-7, the first flange steel 26 includes a working surface 114 that has a first region 118 and a second region 122 that converge at an interior corner 126 of the working surface 114. The first region 118 of the working surface 114 generally has a profile that corresponds to the first anvil edge 46. The corner 126 of the working surface 114 has a profile that corresponds to the corner 66 of the first anvil 18. The second region 122 of the working surface 114 has a profile that corresponds to a portion of the second anvil edge 50.

Figure 12:
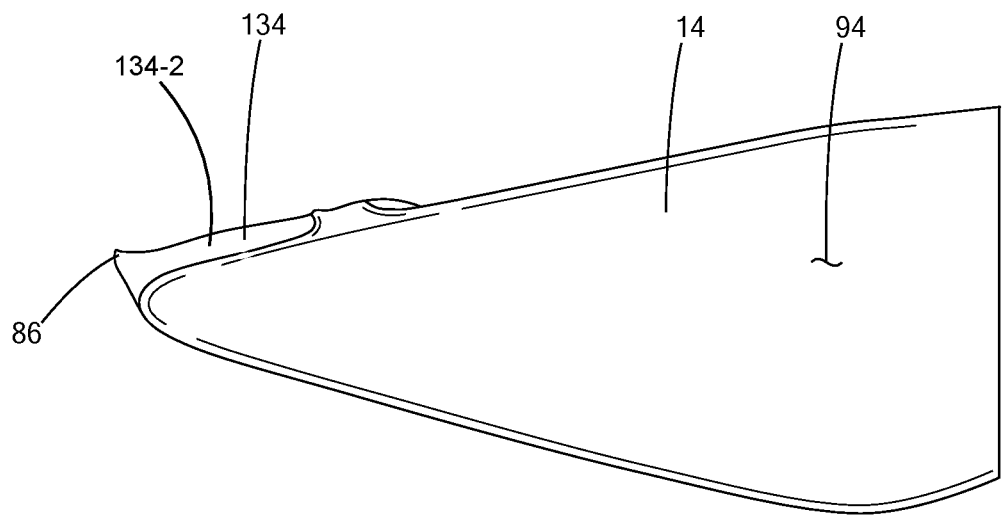
FIG. 12 is a plan view of an exterior side of the workpiece of FIG. 1 after the workpiece has been pressed between the set of tools of FIG. 1.
Figure 13:
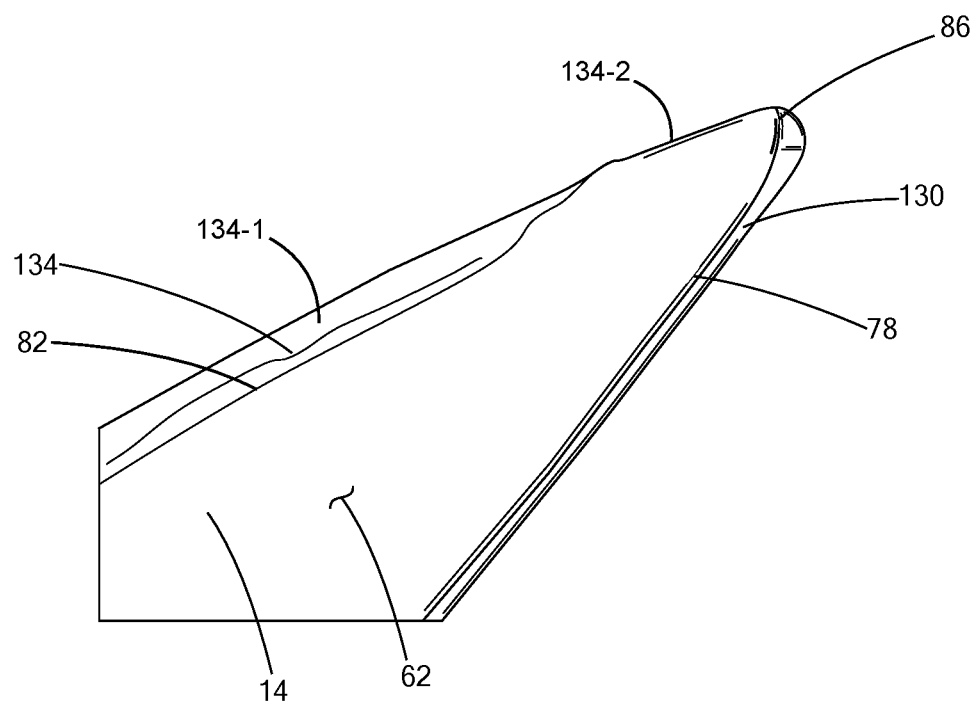
FIG. 13 is a plan view of an interior side of the workpiece of FIG. 12.

When the first flange steel 26 is in the closed position, the first region 118 opposes the first bend surface 54. In the example provided, when the first flange steel 26 is in the closed position, the first region 118 is spaced apart from the first bend surface 54 by the thickness of the workpiece 14 at the first edge 78 so that moving the first flange steel 26 to the closed position bends the first edge 78 of the workpiece 14 around the first anvil edge 46 to start to form a first flange 130 (as shown in FIG. 13). When the first flange steel 26 is in the closed position, the second region 122 of the first flange steel 26 opposes the second region 74 of the second bend surface 58. In the example provided, when the first flange steel 26 is in the closed position, the second region 122 of the first flange steel 26 maintains a space apart from the second region 74 of the second bend surface 58 that is the thickness of the workpiece 14 at the second edge 82 so that moving the first flange steel 26 to the closed position bends the second edge 82 of the workpiece 14 around the second anvil edge 50 to start to form part of a second flange 134 (e.g., a second region 134-2 of the second flange 134, as shown in FIGS. 12 and 13).

The second flange steel 30 includes a working surface 138 that generally has a profile that corresponds to the second anvil edge 50. The working surface 138 has a profile that corresponds to a portion of the second anvil edge 50 from the second region 122 of the first flange steel 26 in the direction away from the corner 66.

When the second flange steel 30 is in the closed position, the working surface 138 opposes the second bend surface 58. In the example provided, when the second flange steel 30 is in the closed position, the working surface 138 is spaced apart from the second bend surface 58 by the thickness of the workpiece 14 at the second edge 82 so that moving the second flange steel 30 to the closed position bends the second edge 82 of the workpiece 14 around the second anvil edge 50 to form part of the second flange 134 (e.g., a first region 134-1 of the second flange 134, as shown in FIG. 13). In the example provided, a portion of the working surface 138 opposes part of the second region 74 (i.e., part of the controlled unwinding region) and the working surface 138 extends along the second anvil edge 50 until opposing the first region 70. In other words, the working surfaces 114, 138 cooperate to form adjacent parts of the unwinding second region 74. In the example provided, the working surface 138 of the second flange steel 30 opposes the full unwinding part of the second region 74 and the angle of the working surface 114 and the corresponding part of region 74 remains substantially constant until the corner 66. In an alternative configuration, not specifically shown, the unwinding angle can continue into the working surface 114 of the first flange steel 26.

Figure 9:
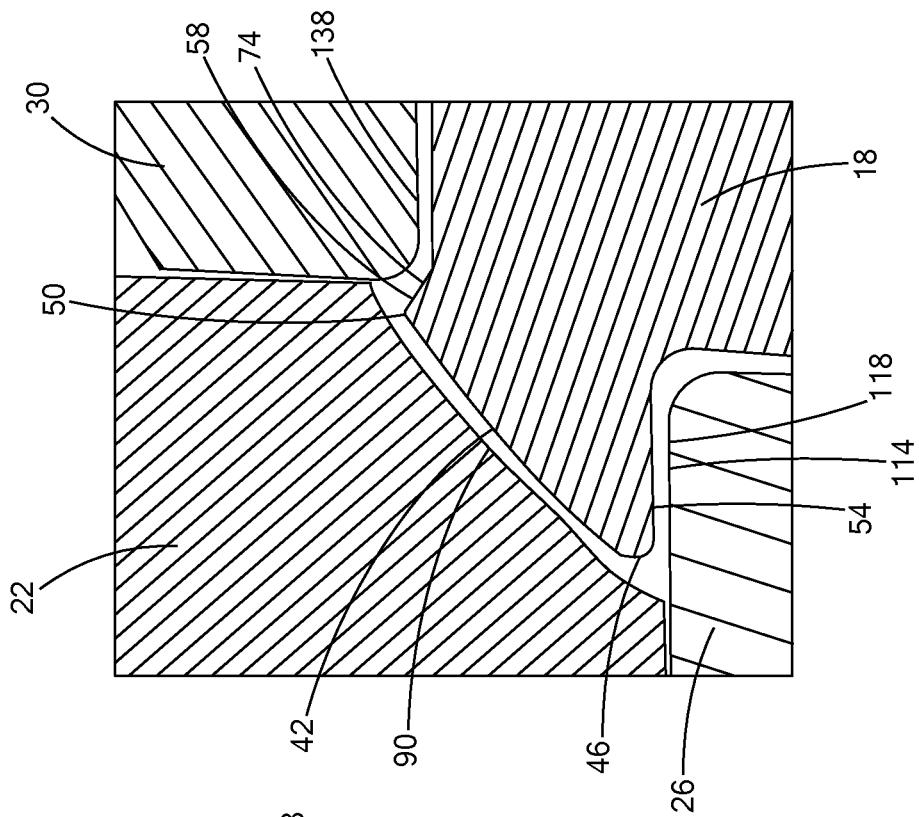
FIG. 9 is a cross-sectional view of the set of tools of FIG. 1, taken along line 9-9 shown in FIG. 7, illustrating the main pad, first flange steel, and second flange steel in closed positions.
Figure 8:
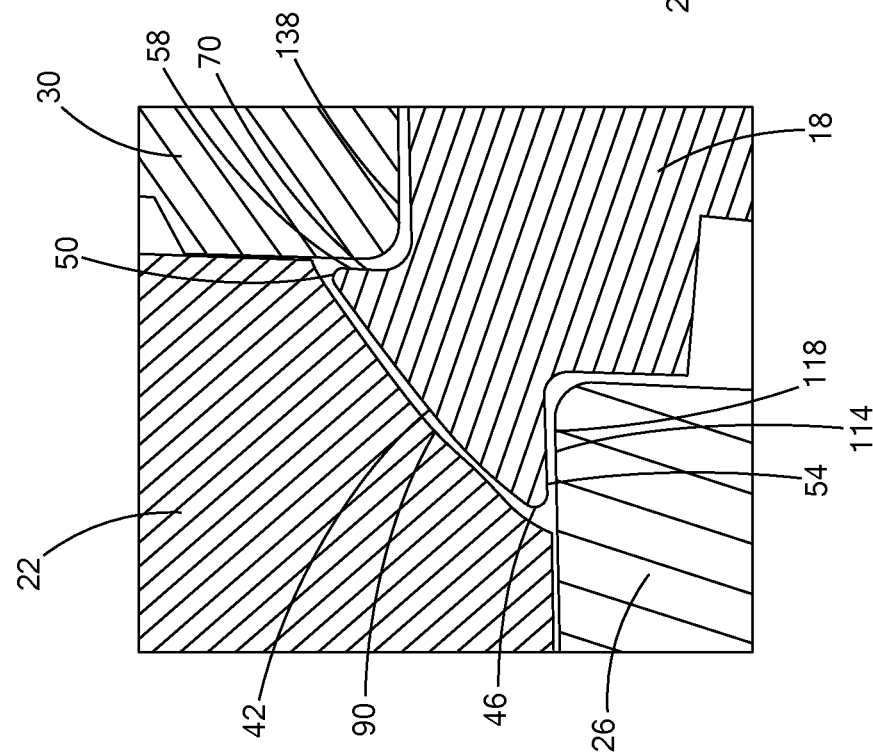
FIG. 8 is a cross-sectional view of the set of tools of FIG. 1, taken along line 8-8 shown in FIG. 7, illustrating the main pad, first flange steel, and second flange steel in closed positions.

With additional reference to FIGS. 8-11, cross-sectional views are provided to better illustrate the progression and unwind of the second bend surface 58 and the working surfaces 114, 138. FIG. 8 illustrates a location corresponding to the first region 70 in which the workpiece 14 is contacted by the first anvil 18, the first pad 22, the first flange steel 26, and the second flange steel 30. At this location, the second edge 82 of the workpiece 14 is bent greater than 90° around the second anvil edge 50. FIG. 9 illustrates a location closer to the corner 66 than shown in FIG. 8 and corresponding to the unwinding second region 74 in which the workpiece 14 is contacted by the first anvil 18, the first pad 22, the first flange steel 26, and the second flange steel 30. At this location, the second edge 82 of the workpiece 14 is bent approximately 90° around the second anvil edge 50. FIG. 10 illustrates a location closer to the corner 66 than shown in FIG. 9 and corresponding to the unwinding second region 74 in which the workpiece 14 is contacted by the first anvil 18, the first pad 22, the first flange steel 26, and the second flange steel 30. At this location, the second edge 82 of the workpiece 14 is bent less than 90° around the second anvil edge 50. FIG. 11 illustrates a location closer to the corner 66 than shown in FIG. 10 and corresponding to the unwinding second region 74 in which the workpiece 14 is contacted by the first anvil 18, the first pad 22, and the first flange steel 26, but not the second flange steel 30. At this location, the second edge 82 of the workpiece 14 is bent less than 90° around the second anvil edge 50 and, in the example provided, is approximately equal to the amount at the location shown in FIG. 10. In the example provided, the first edge 78 of the workpiece 14 is bent greater than 90° around the first anvil edge 46 along the length of the first anvil edge 46 (e.g., at the locations shown in FIGS. 8-11).

With additional reference to FIGS. 12 and 13, the workpiece 14 is illustrated in a condition after being bent by the first and second flange steels 26, 30. FIG. 12 illustrates the outer side of the workpiece 14. As shown, the second flange 134 unwinds in a manner that corresponds to the second region 74 as it approaches the corner 86 of the workpiece 14. FIG. 13 illustrates the inner side of the workpiece 14 including the first flange 130 and the second flange 134.

Figure 14:
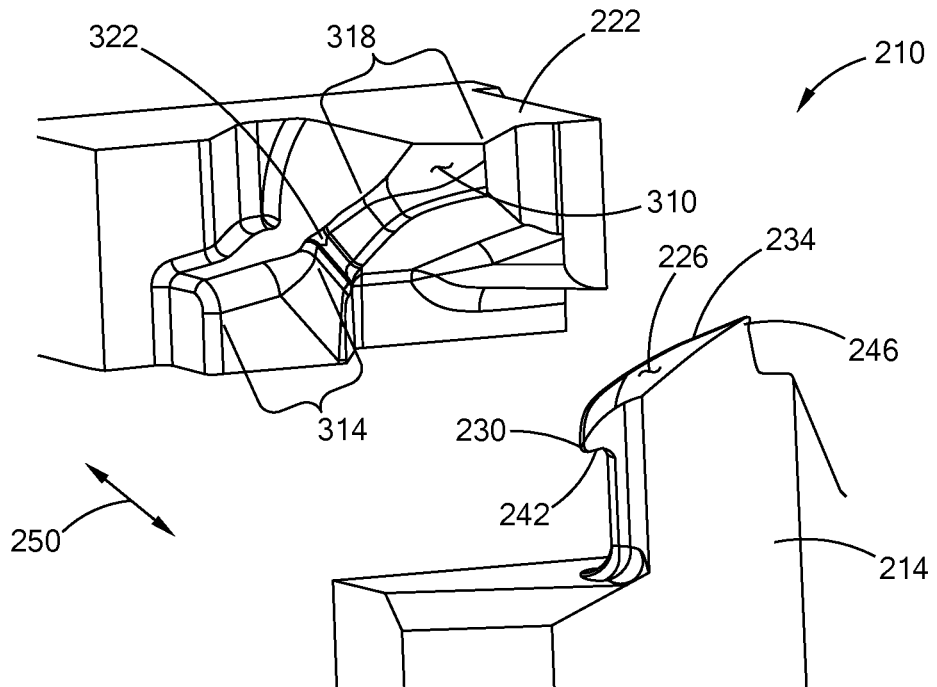
FIG. 14 is a perspective view of a second set of tools in accordance with the teachings of the present disclosure, illustrating a third flange steel in an open position relative to a second anvil.

With additional reference to FIG. 14, after bending the workpiece with the first and second flange steels 26, 30, the workpiece 14 (i.e., in the condition shown in FIGS. 12 and 13) is then placed between a second set of stamping tools 210. The second set of stamping tools 210 includes a second flange post (i.e., a second anvil 214), a second pad 218 (shown in FIG. 16), and a third flange steel 222. The workpiece 14 is placed onto the second anvil 214. The second anvil 214 has a supporting surface 226, a first anvil edge 230 and a second anvil edge 234. The supporting surface 226 contacts and supports the interior surface 62 of the workpiece 14. The first and second anvil edges 230, 234 correspond to the first and second edges 78, 82 and converge at a corner 238 that corresponds to and nests within the corner 86 of the workpiece 14. The first anvil edge 230 is defined along a junction between the supporting surface 226 and a first bend surface 242 of the second anvil 214. The second anvil edge 234 is defined along a junction between the supporting surface 226 and a second bend surface 246 of the second anvil 214.

The first bend surface 242 forms a sharp angle with the supporting surface 226 along the first anvil edge 230. In the example provided, the sharp angle between the first bend surface 242 and the supporting surface 226 is sharper than the angle between the supporting surface 42 (FIGS. 8-11) and the first bend surface 54 (FIGS. 8-11) and is relatively consistent as it continues all the way to the corner 238. The second bend surface 246 forms a sharp angle with the supporting surface 226 along the second anvil edge 234. In the example provided, the sharp angle between the second bend surface 246 and the supporting surface 226 is sharper than the angle between the supporting surface 42 (FIGS. 8-11) and the unwinding second region 74 (FIGS. 8-11) and is relatively consistent and continues all the way to the corner 238.

Figure 16:
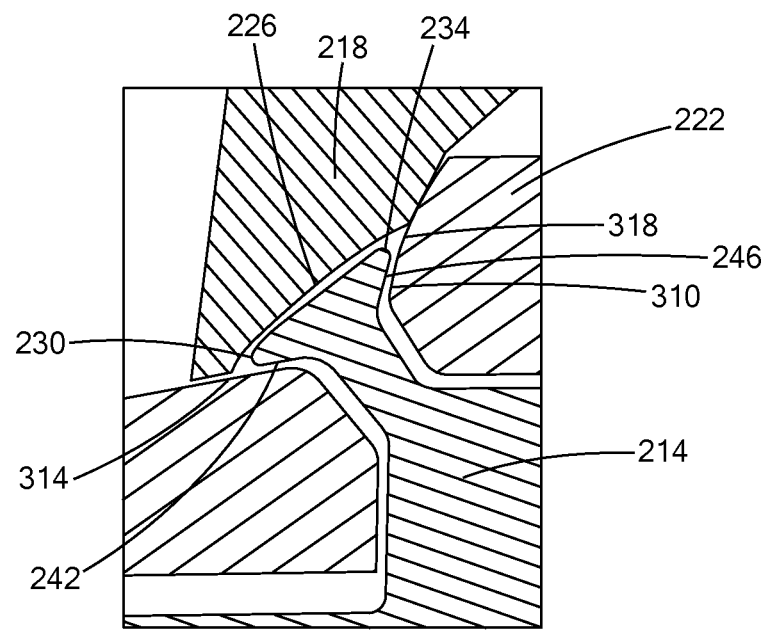
FIG. 16 is a cross-sectional view of the set of tools of FIG. 14, taken along line 16-16 shown in FIG. 15, illustrating a second pad and the third flange steel in closed positions.

The second pad 218 (FIG. 16) is movable along the second direction 34 relative to the second anvil 214 between an open position and a closed position (shown in FIG. 16). In the closed position, the second pad 218 contacts the Class A surface 94 of the workpiece 14 and holds the workpiece 14 against the second anvil 214.

Figure 15:
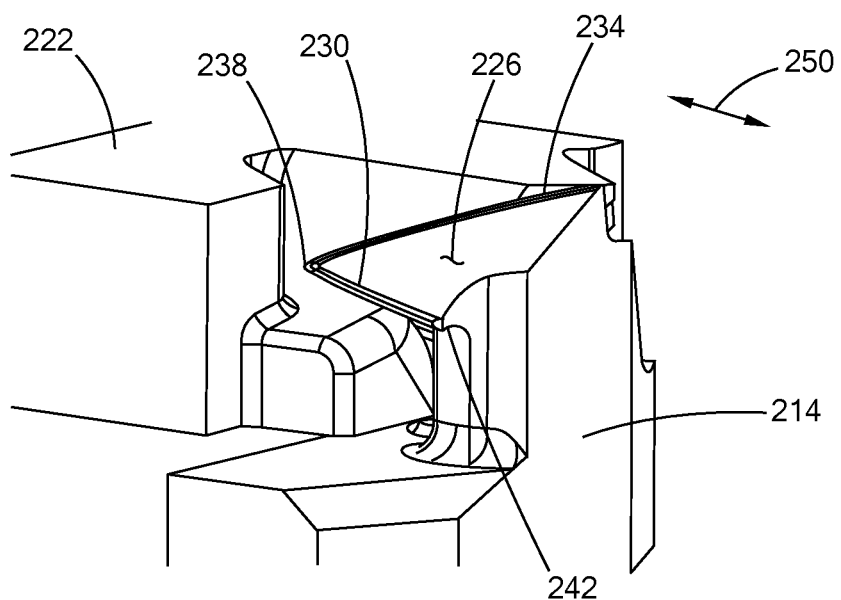
FIG. 15 is a perspective view of the set of tools of FIG. 14, illustrating the third flange steel in a closed position.

With reference to FIGS. 14-16, the third flange steel 222 is movable relative to the second anvil 214 and the second pad 218 along a third axis or third direction 250. The third direction 250 is transverse to the second direction 34 and the first direction 38. The third flange steel 222 is movable between an open position (shown in FIG. 14) and a closed position (shown in FIGS. 15 and 16).

The third flange steel 222 has a continuous working surface 310 that has a first region 314 and a second region 318 that converge at an interior corner 322. The first region 314 is configured to mate with and oppose the first bend surface 242. The second region 318 is configured to mate with and oppose the second bend surface 246. The corner 322 of the third flange steel 222 is configured to mate with the corner 238 of the second anvil 214 and wrap around the junction between the first and second bend surfaces 242, 246.

In the example provided, when the third flange steel 222 is in the closed position, the first region 314 is spaced apart from the first bend surface 242 by a distance equal to the thickness of the first flange 130 and the second region 318 is spaced apart from the second bend surface 246 by a distance equal to the second flange 134. Thus, moving the third flange steel 222 to the closed position bends the first flange 130 further around the first anvil edge 230 and also bends the second flange 134 further around the second anvil edge 234.

Figure 17:
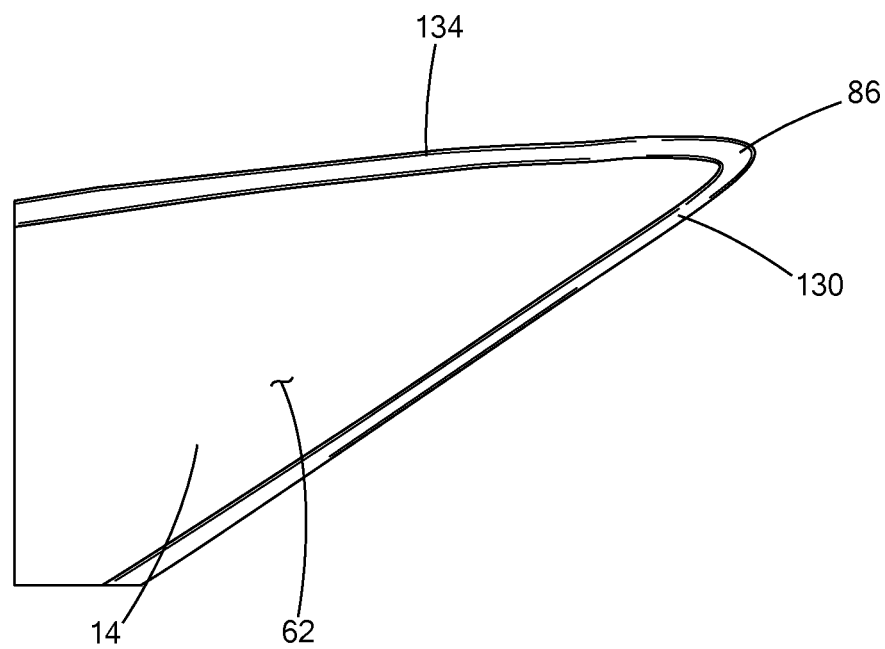
FIG. 17 is a plan view of an interior side of the workpiece of FIG. 12 after the workpiece has been pressed between the set of tools of FIG. 14.

After bending the first and second flanges 130, 134 between the second anvil 214 and the third flange steel 222, the first and second flanges 130, 134 have been bent greater than 90° relative to the Class A surface 94 along the length of the first and second edges 78, 82 including at the corner 238. Since the workpiece 14 is bent over on itself around the second anvil 214 at the first and second flanges 130, 134, the second anvil 214 must then be moved in the direction away from the corner 86 of the workpiece 14 in order to extract the workpiece 14. The interior side of the workpiece 14 after extraction is shown in FIG. 17. By bending the workpiece 14 using the tools and method described herein, including the controlled unwind proximate to the corner 66, the first and second flanges 130, 134 can be formed without distorting the Class A surface 94 of the workpiece 14.

While the steps of the method are described with reference to a particular example order of the steps, this example order is not intended to be understood as the only possible order of the steps.

Thus, the teachings of the present disclosure provide stamping tools and a cost effective method for forming flanges that are bent greater than 90° all the way to the corner of the workpiece while maintaining a Class A surface proximate to the corner.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A set of stamping tools for forming a panel from a sheet metal workpiece, the panel including a main surface, an interior surface opposite the main surface, a first flange along a first edge of the main surface, and a second flange along a second edge of the main surface, the first and second edges converging to form a corner of the panel, the set of stamping tools comprising:
   a first anvil including a support surface, a first bend surface, and a second bend surface, wherein the support surface is configured to contact the interior surface, wherein the first anvil defines a first edge at a junction between the support surface and the first bend surface, wherein the first anvil defines a second edge at a junction between the support surface and the second bend surface, wherein the first and second edges of the first anvil converge at a corner of the first anvil;
   a first pad including a first clamp surface opposing the support surface and configured to contact the main surface of the workpiece;
   a first flange steel movable relative to the first anvil and the first pad between an open position and a closed position, wherein the first flange steel includes a first region and a second region, wherein, the first flange steel is configured such that, in its closed position, the first region of the first flange steel opposes the first bend surface and the second region of the first flange steel opposes the second bend surface; and
   a second flange steel movable relative to the first anvil, the pad, and the first flange steel between an open position and a closed position, wherein the second flange steel includes a working surface, wherein the second flange steel is configured such that, in its closed position, the working surface opposes the second bend surface,
   wherein the first region of the first flange tool is configured such that movement of the first flange steel from its open position to its closed position is configured to bend a first edge region of the workpiece around the first edge of the first anvil to a first bend angle; and
   wherein the working surface of the second flange steel and the second region of the first flange steel are configured to cooperate such that movement of the first and second flange steels from their open positions to their closed positions is configured to bend a second edge region of the workpiece around the second edge of the first anvil to a second bend angle that becomes less bent as the second edge region approaches the corner of the anvil.

2. The set of stamping tools of claim 1, wherein the first and second regions of the first flange steel converge at an interior corner of the first flange steel, the interior corner of the first flange steel corresponding to the corner of the first anvil.

3. The set of stamping tools of claim 1, wherein the second bend surface includes a first region and the working surface includes a first region, wherein, the second flange steel is configured such that, in its closed position, the first region of the working surface opposes the first region of the second bend surface, wherein, in the closed position of the second flange steel, the first region of the second bend surface and the first region of the working surface are configured such that the second bend angle is greater than 90 degrees for a first length of the second edge region of the workpiece.

4. The set of stamping tools of claim 3, wherein the second bend surface includes a second region and the working surface includes a second region, wherein, the second flange steel is configured such that, in the closed position, the second region of the working surface opposes the second region of the second bend surface, wherein, in the closed position of the second flange steel, the second region of the second bend surface and the second region of the working surface are configured such that the second bend angle is constant along the first length of the second edge region of the workpiece and the second bend angle becomes less bent along a second length of the second edge region of the workpiece.

5. The set of stamping tools of claim 3, wherein, the first flange steel is configured such that, in its closed position, the second region of the first flange steel and the second bend surface cooperate to define the second bend angle to be less than 90 degrees at the second region of the first flange steel.

6. The set of stamping tools of claim 1, wherein the first flange steel moves in a first direction from its open position to its closed position and the second flange steel moves in a second direction from its open position to its closed position, the second direction being transverse to the first direction.

7. The set of stamping tools of claim 6, wherein the pad is movable relative to the first anvil in the second direction.

8. The set of stamping tools of claim 1, wherein the first bend angle is greater than 90 degrees.

9. The set of stamping tools of claim 1, further comprising:
a second anvil including a support surface, a first bend surface, and a second bend surface, wherein the support surface of the second anvil is configured to contact the interior surface after the workpiece has been deformed by the first and second flange steels, wherein the second anvil defines a first edge at a junction between the support surface of the second anvil and the first bend surface of the second anvil, wherein the second anvil defines a second edge at a junction between the support surface of the second anvil and the second bend surface of the second anvil, wherein the first and second edges of the second anvil converge at a corner of the second anvil;
a second pad including a second clamp surface opposing the support surface of the second anvil and configured to contact the main surface of the workpiece after the workpiece has been deformed by the first and second flange steels; and
a third flange steel movable relative to the second anvil and the second pad between an open position and a closed position, wherein the third flange steel includes a working surface, wherein the third flange steel is configures such that, in its closed position, the working surface opposes the second bend surface of the second anvil, wherein the working surface of the third flange steel is configured such that movement of the third flange steel from its open position to its closed position is configured to bend the second edge region of the workpiece to a total bend angle that is greater than 90 degrees.

* * * * *